US009753571B2

(12) United States Patent
Lin

(10) Patent No.: US 9,753,571 B2
(45) Date of Patent: Sep. 5, 2017

(54) TOUCH PANEL STRUCTURE

(71) Applicant: Chih-Chung Lin, Taipei (TW)

(72) Inventor: Chih-Chung Lin, Taipei (TW)

( * ) Notice: Subject to any disclaimer, the term of this patent is extended or adjusted under 35 U.S.C. 154(b) by 267 days.

(21) Appl. No.: 14/590,934

(22) Filed: Jan. 6, 2015

(65) Prior Publication Data
US 2016/0147334 A1   May 26, 2016

(30) Foreign Application Priority Data
Nov. 26, 2014   (TW) .............................. 103144687 A

(51) Int. Cl.
  *G06F 3/041*   (2006.01)
(52) U.S. Cl.
  CPC .................................. *G06F 3/0416* (2013.01)
(58) Field of Classification Search
  CPC ...................................... G06F 3/41; G06F 3/45
  USPC ........................................................ 345/174
  See application file for complete search history.

(56) References Cited

U.S. PATENT DOCUMENTS

| 2005/0126831 A1* | 6/2005 | Richter | ................... G06F 3/045 |
| | | | 178/18.01 |
| 2016/0041637 A1* | 2/2016 | Guard | ..................... G06F 3/041 |
| | | | 345/174 |

* cited by examiner

*Primary Examiner* — Albert Wong
(74) *Attorney, Agent, or Firm* — C. G. Mersereau; Nikolai & Mersereau, P.A.

(57) ABSTRACT

A touch panel structure includes: a transparent substrate; a shield layer on one face of the transparent substrate; a touch electrode layer on the face of the transparent substrate, a part of the touch electrode layer extending to a face of the shield layer distal from the transparent substrate; a lead layer on the face of the shield layer; an integrated circuit in the non-touch section on the face of the shield layer and electrically connected to the touch electrode layer and the lead layer; and a flexible circuit board electrically connected to lead layer. The number of the connection pins at the electrical junction between the flexible circuit board and the lead layer is reduced. When assembled with the mechanism, the possibility of interference between the flexible circuit board, the integrated circuit and the mechanism is minimized to avoid poor contact of the integrated circuit.

10 Claims, 4 Drawing Sheets

TOUCH PANEL STRUCTURE

This application claims the priority benefit of Taiwan patent application number 103144687 filed on Nov. 26, 2014.

BACKGROUND OF THE INVENTION

1. Field of the Invention

The present invention relates generally to a touch panel structure, and more particularly to a touch panel structure in which the number of the signal connection pins is reduced, whereby when assembled with the mechanism, the possibility of interference between the flexible circuit board and the integrated circuit and the mechanism is minimized. In this case, the integrated circuit is prevented from poorly contacting the flexible circuit board.

2. Description of the Related Art

Along with the fast development of information technique and communication networks, various electronic information products have been more and more popularly used by individuals. Also, the touch panels have been rapidly developed. According to the induction principle, the existent touch panels can be mainly classified into four types, that is, resistance type, capacitance type, electromagnetic type and optical type. With respect to the capacitance type touch panel structure, such type touch panel structure has the advantages of dustproof, fireproof and high definition. Therefore, the capacitance type touch panels are widely used. The working principle of the capacitance type touch panel is that the contact position is identified from capacitance change. The coordinates of the contact point are found from the capacitance change between the electrodes due to the touch of a conductor such as a user's finger.

The capacitance type touch panel has gradually become the main stream in the touch techniques. The capacitance type touch panel is widely applied to various electronic information products such as cellular phones, tablets, walkmans, handheld electronic apparatuses, displays, monitors, and so on. The working principle of the electronic information product with the capacitance type touch panel is that when a human finger or a conductive object touches the transparent electrodes of indium tin oxide (ITO) on the capacitance type touch panel, a capacitance induction is produced. A control IC calculates the capacitance induction and converts it into coordinate data readable by the operation system. Therefore, the position change of the finger and the touch state can be found to achieve the object of operation and control.

Please refer to FIGS. 1 and 2. FIG. 1 is a plane view of a conventional touch unit, showing that the conventional touch unit is connected with a flexible circuit board. FIG. 2 is a side view of the conventional touch unit, showing that the conventional touch unit is connected with the flexible circuit board. The touch unit 1 has a first face 11 and a second face 12. A flexible circuit board 13 is electrically connected to the second face 12. Multiple electronic components 131 and a control IC 132 are arranged on the flexible circuit board 13. Via the flexible circuit board 13, the control IC 132 is electrically connected to the touch unit 1 and the system end. When a human finger or a conductive object produces capacitance induction on the touch unit 1, the control IC 132 will calculate the sensation signal to read the coordinate data thereof so as to find the position change of the finger and the touch state to achieve the object of operation and control. Therefore, it is necessary to take the arrangement position of the control IC 132 on the flexible circuit board 13 into consideration. Accordingly, the flexible circuit board 13 must have a considerably large area to increase the arrangement space. In addition, the number of the signal connection pins between the flexible circuit board 13 and the touch unit 1 must be increased in accordance with the control IC 132. As a result, when assembling the flexible circuit board 13 with the mechanism, the possibility of interference between the flexible circuit board 13 and the mechanism is increased. Moreover, when assembled, the flexible circuit board 13 will be bent to a considerable extent to cause poor contact of the control IC 132.

SUMMARY OF THE INVENTION

It is therefore a primary object of the present invention to provide a touch panel structure in which the number of the signal connection pins is reduced, whereby when assembled, the possibility of interference between the flexible circuit board and the integrated circuit is minimized. In this case, the integrated circuit is prevented from poorly contacting the flexible circuit board.

To achieve the above and other objects, the touch panel structure of the present invention includes a transparent substrate, a shield layer, a touch electrode layer, a lead layer, an integrated circuit and a flexible circuit board. The transparent substrate has a first face and a second face. The transparent substrate is defined with a touch section at a center of the transparent substrate and a non-touch section around the touch section. The shield layer is disposed on the second face in the non-touch section. The touch electrode layer is disposed on the second face in the touch section. A part of the touch electrode layer extends from the second face to a face of the shield layer, which face is distal from the transparent substrate. The lead layer is disposed on one face of the shield layer, which face is distal from the second face. The integrated circuit is disposed in the non-touch section and electrically connected to the touch electrode layer and the lead layer. The flexible circuit board is disposed in the non-touch section and electrically connected to lead layer. The integrated circuit is disposed in the non-touch section and electrically connected to the touch electrode layer and the lead layer. Therefore, the number of the connection pins at the electrical junction between the flexible circuit board and the lead layer is reduced so that the application area is reduced. Accordingly, when assembled with the mechanism, the possibility of interference between the flexible circuit board and the integrated circuit and the mechanism is minimized. In this case, the integrated circuit is prevented from poorly contacting the flexible circuit board due to flexion of the flexible circuit board.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
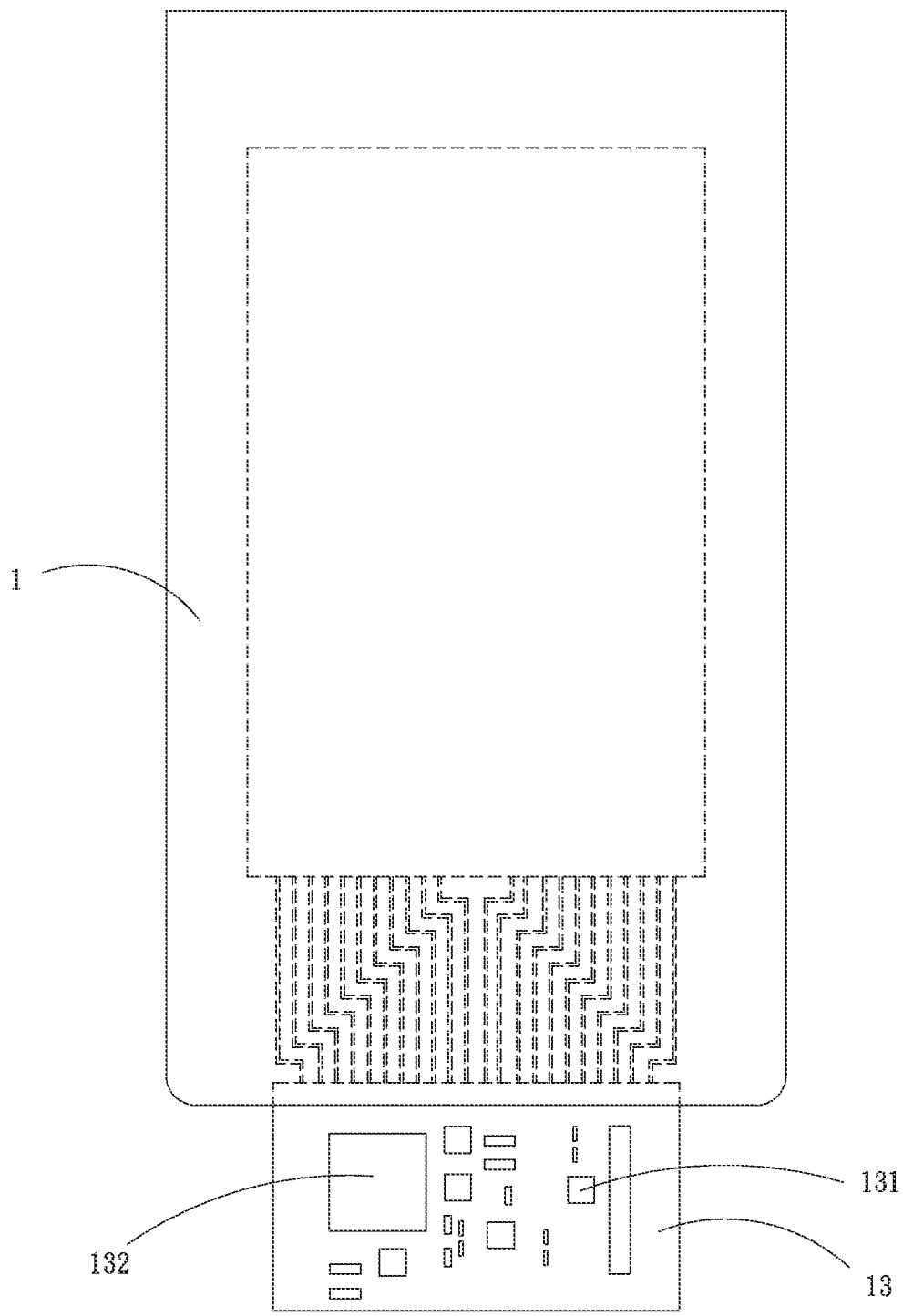
FIG. 1 is a plane view of a conventional touch unit, showing that the conventional touch unit is connected with a flexible circuit board.
Figure 2:
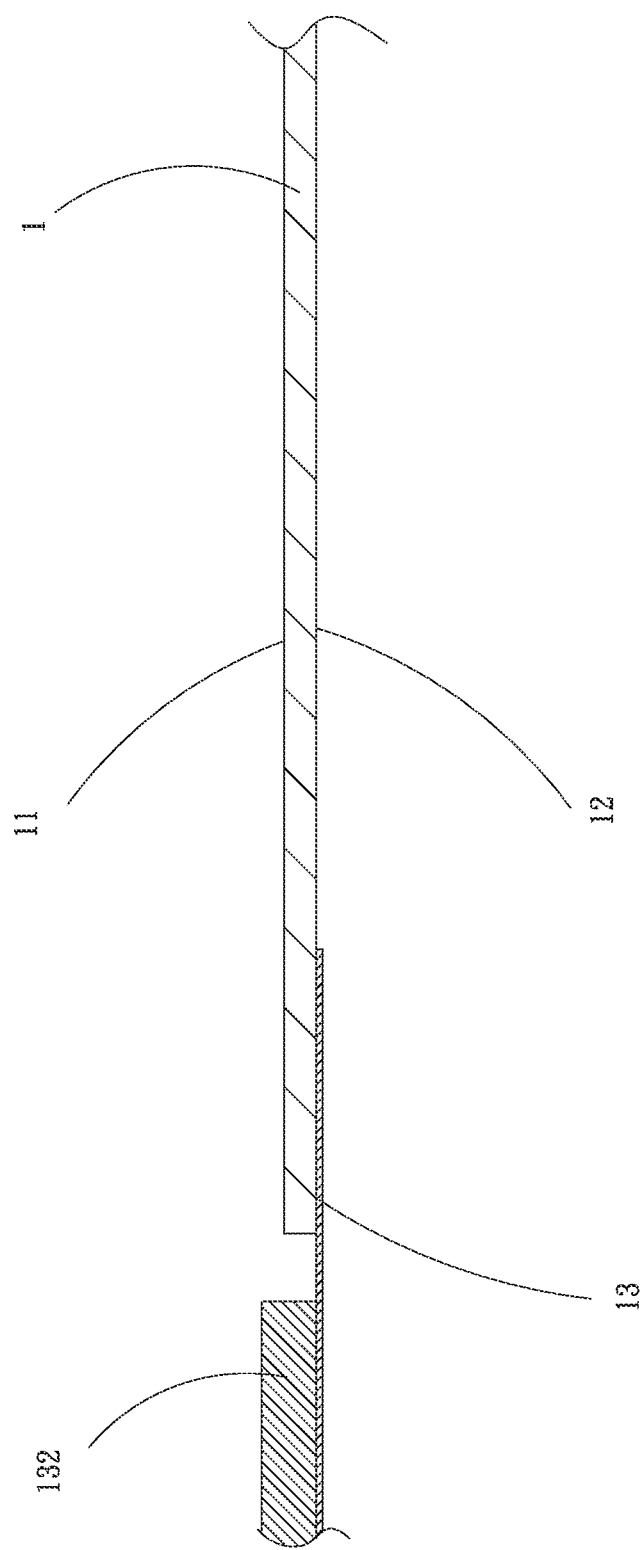
FIG. 2 is a side view of the conventional touch unit, showing that the conventional touch unit is connected with the flexible circuit board.
Figure 3:
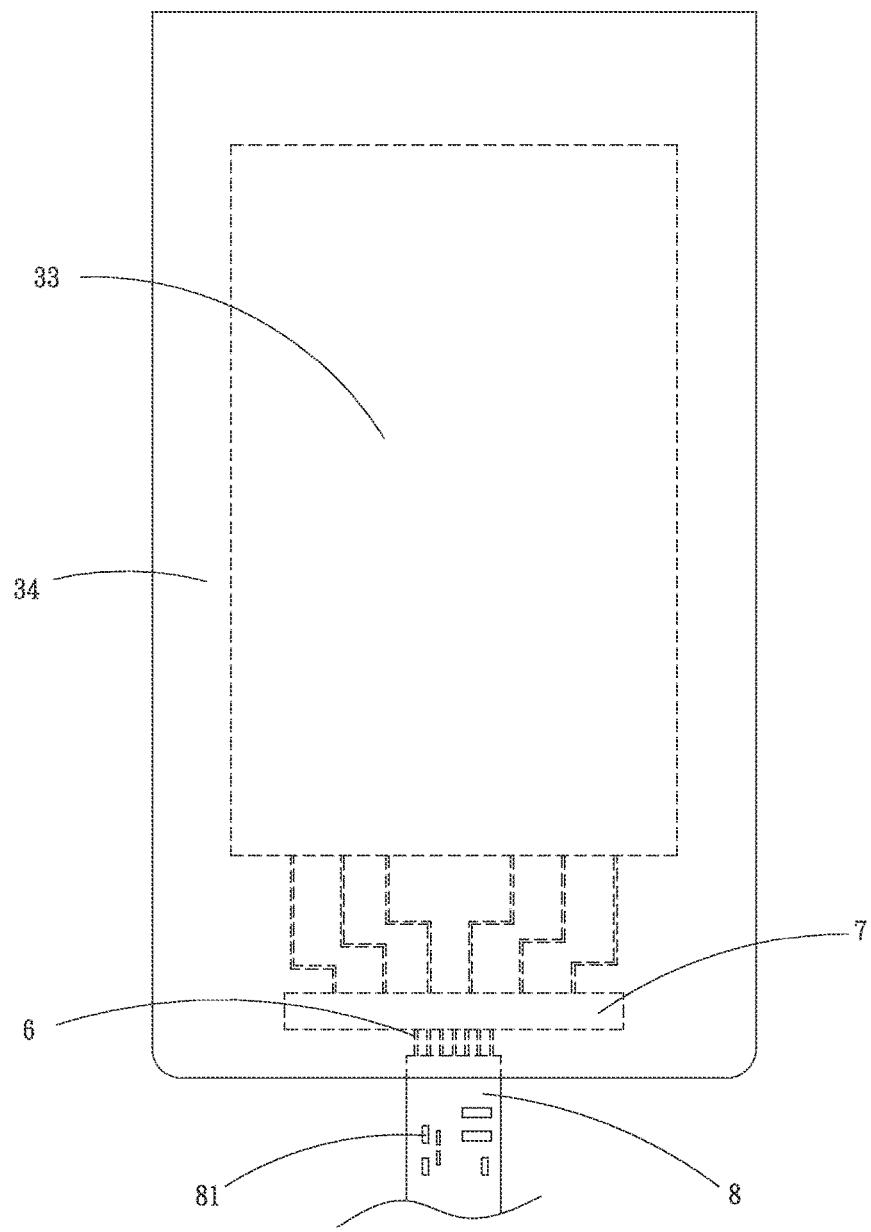
FIG. 3 is a plane view of a preferred embodiment of the touch panel structure of the present invention.
Figure 4:
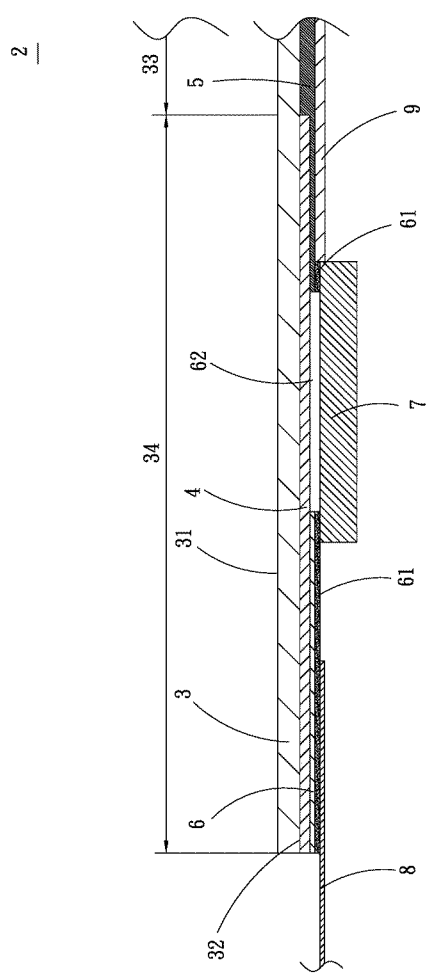
FIG. 4 is a sectional view of the preferred embodiment of the touch panel structure of the present invention.

Please refer to FIGS. 3 and 4. FIG. 3 is a plane view of a preferred embodiment of the touch panel structure of the present invention. FIG. 4 is a sectional view of the preferred embodiment of the touch panel structure of the present invention. According to the preferred embodiment, the touch panel structure 2 of the present invention includes a transparent substrate 3, a shield layer 4, a touch electrode layer 5, a lead layer 6, an integrated circuit 7 and a flexible circuit board 8.

The transparent substrate 3 has a first face 31 and a second face 32 opposite to the first face 31. The transparent substrate 11 is defined with a touch section 33 at the center of the transparent substrate 11 and a non-touch section 34 around the touch section 33. The material of the transparent substrate 3 is selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC). In this embodiment, the material of the transparent substrate 3 is, but not limited to, glass for illustration.

The shield layer 4 is disposed on the second face 32 of the transparent substrate 3 in the non-touch section 34. A section of the transparent substrate 3 that is coated with the shield layer 4 is defined as the non-touch section 34. Reversely, a section of the transparent substrate 3 that is not coated with the shield layer 4 is defined as the touch section 33. In this embodiment, the shield layer 4 is formed of nontransparent and insulation material and disposed on the second face 32 of the transparent substrate 3 by printing or coating.

The touch electrode layer 5 is disposed on the second face 32 of the transparent substrate 3 in the touch section 33. A part of the touch electrode layer 5 extends from the second face 32 of the transparent substrate 3 to a face of the shield layer 4, which face is distal from the transparent substrate 3. The touch electrode layer 5 is selected from a group consisting of indium tin oxide (ITO) coating, antimony tin oxide (ATO) coating and indium zinc oxide (IZO) coating. In practice, the touch electrode layer 5 is formed on the second face 32 and the shield layer 4 by means of gelatinization, electroplating, sputtering deposition or evaporation. In this embodiment, the touch electrode layer 5 is formed on the second face 32 and the shield layer 4 by means of sputtering deposition for illustration. An insulation layer 9 is further disposed on one face of the part of the touch electrode layer 5, which face is distal from the shield layer 4 and the transparent substrate 3. The insulation layer 9 is coated on the part of the touch electrode layer 5. The insulation layer 9 is formed on the touch electrode layer 5 by means of halftone printing, offset printing or releasable attachment.

The lead layer 6 is disposed in the non-touch section 34 on one face of the shield layer 4, which face is distal from the second face 32. A preserved space 62 is formed between the lead layer 6 the touch electrode layer 5. The lead layer 6 is formed by means of silver paste printing or sputtering deposition. The lead layer 6 has a conductive paste layer 61 disposed on one face of the lead layer 6, which face is distal from the shield layer 4. The conductive paste layer 61 is an anisotropic conductive film (ACF) or an anisotropic conductive paste (ACP).

The integrated circuit 7 is a touch integrated circuit (IC). The integrated circuit 7 is positioned in the non-touch section 34 and disposed on one face of the lead layer 6, which face is distal from the shield layer 4 and on one face of the touch electrode layer 5, which face is distal from the shield layer 4. In addition, the integrated circuit 7 is disposed at the preserved space 62 between the lead layer 6 and the touch electrode layer 5. The conductive paste layer 61 is disposed between the integrated circuit 7 and the lead layer 6 and the touch electrode layer 5. Via the conductive paste layer 61, the integrated circuit 7 is attached to and electrically connected to the lead layer 6 and the touch electrode layer 5.

Multiple electronic components 81 are disposed on the flexible circuit board 8. The flexible circuit board 8 is disposed in the non-touch section 34 and attached to the conductive paste layer 61. The lead layer 6 is disposed on the other face of the conductive paste layer 61, whereby via the conductive paste layer 61, the flexible circuit board 8 is attached to and electrically connected to the lead layer 6. The conductive paste layer 61 is an anisotropic conductive film (ACF) or an anisotropic conductive paste (ACP).

The integrated circuit 7 is disposed at the preserved space 62 in the non-touch section 34 and electrically connected to the touch electrode layer 5 and the lead layer 6. In addition, via the conductive paste layer 61 and the lead layer 6, the flexible circuit board 8 is electrically connected to the integrated circuit 7. When a human finger or conductive object produces capacitance induction on the touch electrode 5, the integrated circuit 7 will calculate the sensation signal to find the coordinate data thereof. The flexible circuit board 8 sends out the coordinate data to further find the position change of the finger and the touch state so as to achieve the object of operation and control. The integrated circuit 7 is disposed in the non-touch section 34 and electrically connected to the touch electrode layer 5 and the lead layer 6. Therefore, the number of the connection pins at the electrical junction between the flexible circuit board 8 and the lead layer 6 is reduced so that the application area is reduced. Accordingly, when assembled with the mechanism, the possibility of interference between the flexible circuit board 8 and the integrated circuit 7 and the mechanism is minimized. In this case, the integrated circuit 7 is prevented from poorly contacting the flexible circuit board 8 or damaging due to flexion of the flexible circuit board 8.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch panel structure comprising:
    a transparent substrate having a first face and a second face, the transparent substrate being defined with a touch section at a center of the transparent substrate and a non-touch section around the touch section;
    a shield layer disposed on the second face in the non-touch section;
    a touch electrode layer disposed on the second face in the touch section, a part of the touch electrode layer extending from the second face to a face of the shield layer, which face is distal from the transparent substrate;
    a lead layer disposed in the non-touch section on one face of the shield layer, which face is distal from the second face;

an integrated circuit disposed in the non-touch section and electrically connected to the touch electrode layer and the lead layer; and a flexible circuit board disposed in the non-touch section and electrically connected to the lead layer;

wherein a preserved space is formed between the lead layer and the touch electrode layer, and the integrated circuit is disposed at the preserved space between the lead layer and the touch electrode layer.

2. The touch panel structure as claimed in claim 1, wherein a conductive paste layer is disposed between the flexible circuit board and the lead layer, whereby via the conductive paste layer, the flexible circuit board is electrically connected to the lead layer.

3. The touch panel structure as claimed in claim 1, further comprising an insulation layer coated on the part of the touch electrode layer, the insulation layer being disposed on one face of the touch electrode layer, which face is distal from the shield layer and the transparent substrate.

4. The touch panel structure as claimed in claim 1, wherein the touch electrode layer is formed by means of halftone printing or offset printing, the touch electrode layer being selected from a group consisting of indium tin oxide (ITO), nano-silver, indium zinc oxide (IZO), indium tin zinc oxide, hafnium oxide, zinc oxide, aluminum oxide, aluminum tin oxide, aluminum zinc oxide, cadmium tin oxide and cadmium zinc oxide.

5. The touch panel structure as claimed in claim 1, wherein the shield layer is disposed on the second face of the transparent substrate by means of ink coating.

6. The touch panel structure as claimed in claim 1, wherein the lead layer is formed by means of silver paste printing or sputtering deposition.

7. The touch panel structure as claimed in claim 3, wherein the insulation layer is formed by means of halftone printing, offset printing or releasable attachment.

8. The touch panel structure as claimed in claim 1, wherein the material of the transparent substrate is selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

9. The touch panel structure as claimed in claim 1, wherein the integrated circuit is a touch integrated circuit (IC).

10. The touch panel structure as claimed in claim 2, wherein the conductive paste layer is disposed between the integrated circuit and the lead layer and the touch electrode layer, whereby via the conductive paste layer, the integrated circuit is electrically connected to the touch electrode layer and the lead layer.

* * * * *